Figure 1:
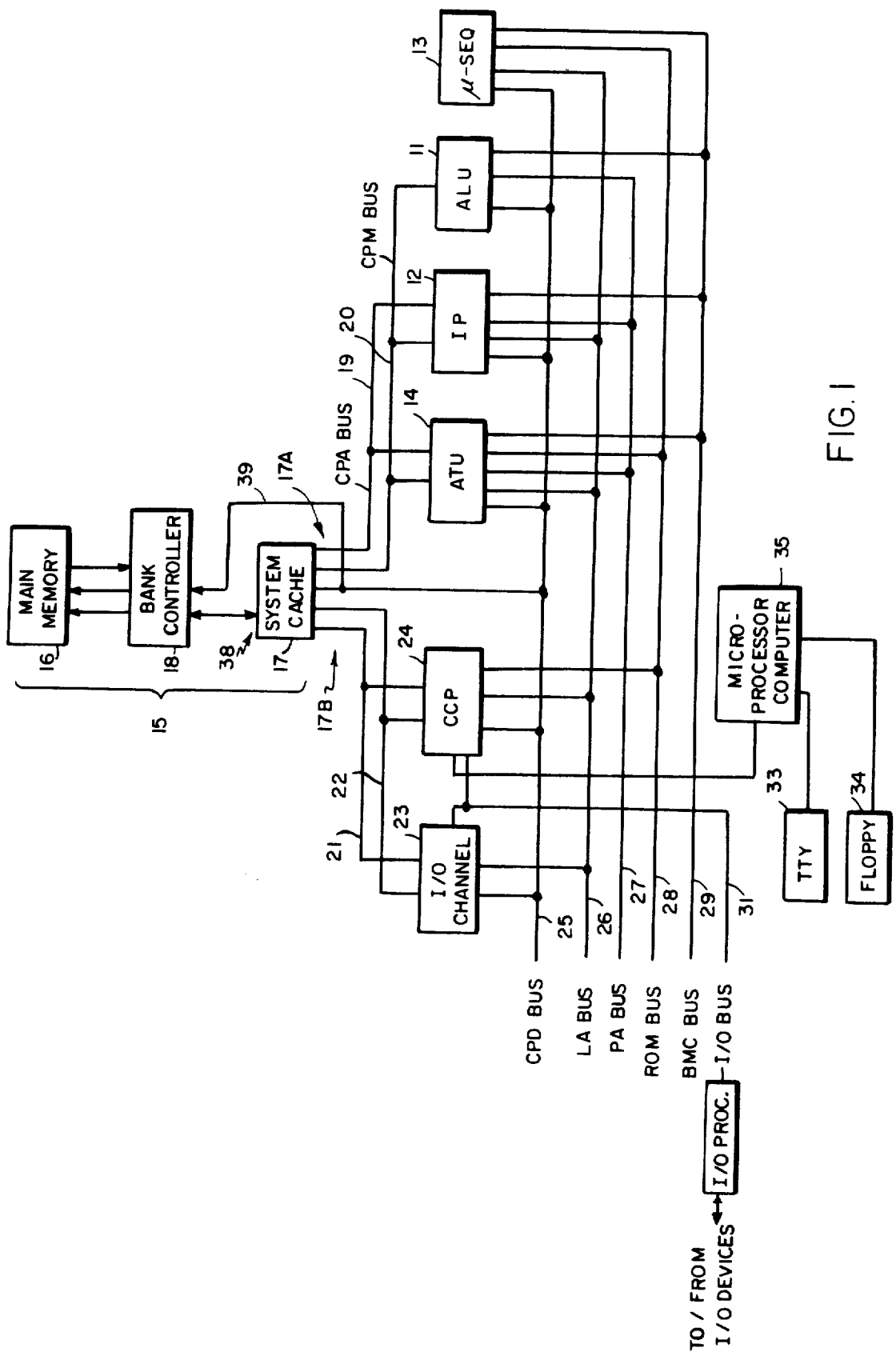

United States Patent [19]

Holland et al.

[11] Patent Number: 4,554,627

[45] Date of Patent: Nov. 19, 1985

[54] DATA PROCESSING SYSTEM HAVING A UNIQUE MICRO-SEQUENCING SYSTEM

[75] Inventors: Charles J. Holland, Northboro; Kenneth D. Holberger, N. Grafton; David I. Epstein, Natick; Paul Reilly, Foxboro; Josh Rosen, Westboro, all of Mass.

[73] Assignee: Data General Corporation, Westboro, Mass.

[21] Appl. No.: 473,560

[22] Filed: Mar. 9, 1983

Related U.S. Application Data

[63] Continuation of Ser. No. 143,710, Apr. 25, 1980, abandoned.

[51] Int. Cl.⁴ ............................................. G06F 13/00
[52] U.S. Cl. .................................................... 364/200
[58] Field of Search ................................. 364/200, 900

[56] References Cited

U.S. PATENT DOCUMENTS

| | | | |
|---|---|---|---|
| 4,003,033 | 1/1977 | O'Keefe | 364/200 |
| 4,038,533 | 7/1977 | Dummermuth | 364/900 |
| 4,155,119 | 5/1979 | DeWard | 364/200 |
| 4,161,778 | 7/1979 | Getson | 364/200 |

Primary Examiner—Raulfe B. Zache
Assistant Examiner—David Y. Eng
Attorney, Agent, or Firm—Robert F. O'Connell

[57] ABSTRACT

A data processing system which handles thirty-two bit logical addresses which can be derived from either sixteen bit logical addresses or thirty-two bit logical addresses, the latter being translated into physical addresses by unique translation means. The system includes means for decoding macro-instructions of both a basic and an extended instruction set, each macro-instruction containing in itself selected bit patterns which uniquely identify which type of instruction is to be decoded. The decoded macro-instructions provide the starting address of one or more micro-instructions, which address is supplied to a unique micro-instruction sequencing unit which appropriately decodes a selected field of each micro-instruction to obtain each successive micro-instruction. The system uses hierarchical memory storage using eight storage segments (rings), access to the rings being controlled in a privileged manner according to different levels of privilege. The memory system uses a bank of main memory modules which interface with the central processor system via a dual port cache memory, block data transfers between the main memory and the cache memory being controlled by a bank controller unit.

10 Claims, 1 Drawing Figure

DATA PROCESSING SYSTEM HAVING A UNIQUE MICRO-SEQUENCING SYSTEM

This is a continuation of application Ser. No. 143,710 filed Apr. 25, 1980 now abandoned.

INTRODUCTION

This invention relates generally to data processing systems and, more particularly, to such systems which can handle 32 bit logical addresses at a size and cost which is not significantly greater than that of systems which presently handle only 16 bit logical addresses.

RELATED APPLICATIONS

This application is one of the following groups of applications, all of which include the same text and drawings which describe an overall data processing system and each of which includes claims directed to a selected aspect of the overall data processing system, as indicated generally by the titles thereof as set forth below. All of such applications are being filed concurrently and, hence, all will have the same filing date.

(1) Data Processing System, Ser. No. 143,561, filed on Apr. 25, 1980 by E. Rasala, S. Wallach, C. Alsing, K. Holberger, C. Holland, T. West, J. Guyer, R. Coyle, M. Ziegler and M. Druke, now U.S. Pat. No. 4,386,399;

(2) Data Processing System Having a Unique Address Translation Unit, Ser. No. 143,681, filed on Apr. 25, 1980 by S. Wallach, K. Holberger, S. Staudener and C. Henry which is abandoned in favor of Ser. No. 451,899;

(3) Data Processing System Utilizing A Hierarchical Memory Storage System, Ser. No. 143,891, filed on Apr. 25, 1980 by S. Wallach, K. Holberger, D. Keating and S. Staudener now U.S. Pat. No. 4,408,655;

(4) Data Processing System Having A Unique Memory System, Ser. No. 143,974, filed on Apr. 25, 1980 by M. Ziegler and M. Druke now abandoned in favor of Ser. No. 447,165 now U.S. Pat. No. 4,497,033;

(5) Data Processing System Having A Unique Instruction Processor System, Ser. No. 143,651, filed on Apr. 25, 1980 by K. Holberger, J. Veres, M. Ziegler and C. Henry now U.S. Pat. No. 4,398,243;

(6) Data Processing System Having A Unique Microsequencing System, Ser. No. 143,710, filed on Apr. 25, 1980 by C. Holland, K. Holberger, D. Epstein, P. Reilly and J. Rosen now abandoned in favor of Ser. No. 473,560;

(7) Data Processing System Having Unique Instruction Responsive Means, Ser. No. 143,982, filed on Apr. 25, 1980 by C. Holland, S. Wallach and C. Alsing now U.S. Pat. No. 434,459.

BACKGROUND OF THE INVENTION

Presently available data processing systems which are often referred to as belonging to the "mini-computer" class normally handle logical addresses and data words which are 16 bits in length. As used herein, the term "logical" address, sometimes referred to by those in the art as a "virtual" address, is used to denote an address that is programmer visible, an address which the programmer can manipulate. In contrast, a "physical" address is the address of a datum location in the main memory of a data processing system. Operating data processing systems utilize appropriate translation tables for converting logical addresses to physical addresses.

Such mini-computers have been successfully used in many applications and provide a high degree of data processing capability at reasonable cost. Examples of such systems which have found favor in the marketplace are those known as the "Nova" and the "Eclipse" systems designed and developed by Data General Corporation of Westboro, Massachusetts. The Nova and Eclipse family of mini-computers are described in the publications available from Data General Corporation which are listed in Appendix A incorporated as part of this specification.

The Nova system provides a logical address space of 64 kilobytes (the prefix "kilo" more accurately represents 1024, or $2^{10}$) and the Eclipse system also provides a logical address space of 64 kilobytes, both being proven systems for handling many applications at reasonable cost. It is desirable in the development of improved systems to provide for an orderly growth in an even larger logical address space than presently available in Nova and Eclipse systems. Such an extended logical address base permits a larger set of instructions to be utilized by the system, the enlarged instruction set being capable of including substantially all of the basic instructions now presently available in the prior Nova and Eclipse systems as well as a large number of additional, or extended, instructions which take advantage of the increased or expanded logical address space.

Accordingly, such an improved system should be designed to be responsive to software which has been previously designed for use in Nova and Eclipse systems so that those presently having a library of Nova and Eclipse software, representing a substantial investment, can still use such software in the improved, expanded address system. The improved system also would provide for a greater flexibility in performance at a reasonable cost so as to permit more on-line users at a larger number of on-line terminals to utilize the system. The expanded address space would further permit the system to support more extensive and sophisticated programs devised specifically therefor, as well as to support all of the previous programs supported by the unextended Nova or Eclipse systems.

BRIEF SUMMARY OF THE INVENTION

The system of the invention utilizes a unique combination of central processor and memory units, the processor comprising an address translation unit, an instruction processor unit, an arithmetic logic unit and a microsequencing unit, while the memory unit includes a system cache unit, a main memory unit and a bank controller unit for controlling data transfers therebetween. The system handles thirty-two bit logical addresses which can be derived from either sixteen bit or thirty-two bit addresses. Unique means are provided for translating the thirty-two bit logical addresses. The system uses hierarchical memory storage, wherein information is stored in different segment storage regions (rings), access to the rings being controlled in a privileged manner so that access to different rings are governed by different levels of privilege.

The memory system uses a main memory comprising a plurality of memory modules each having a plurality of memory planes. The main memory normally interfaces with the remainder of the system via a dual port system cache memory unit, block data transfers between the main memory and the system cache are controlled by a bank controller unit.

Macro-instructions are decoded using a unique programmable read-only-memory means which is capable of decoding instructions of two types, i.e., instructions from a first basic instruction set or instructions from a second extended instruction set, the instruction which is being decoded containing in itself selected bit patterns which uniquely identify which type of instruction is to be decoded.

The decoded instructions provide the starting address of one or more incroinstructions, which starting address is supplied to a unique microinstruction sequencing unit which appropriately decodes a selected field of each microinstruction for determining the address of the next successive mirco-instruction, such address being suitably selected from a plurality of microaddress sources.

The overall system includes means responding to certain macro-instructions which perform unique operations indigenous to the overall system.

DESCRIPTION OF THE INVENTION

The invention can be described in more detail with the help of the drawings wherein:

FIG. 1 shows a block diagram of the overall data processing system of the invention as described therein.

This application incorporates by reference the entire application, Ser. No. 143,982, filed on Apr. 25, 1980, of Charles J. Holland et al., now issued as U.S. Pat. No. 4,434,459, dated Feb. 24, 1984.

What is claimed is:

1. In a data processing system having a central processor which includes means for decoding macroinstructions to produce starting microaddresses of microinstructions and a microsequencing means for providing one or more successive micro-instructions for execution by said central processor, said micro-sequencing means comprising microcontrol store means for storing a plurality of micro-instructions;

said microcontrol store means being responsive to a selected microaddress for accessing a current micro-instruction stored at said selected microaddress of said microcontrol store means;

micro-instruction decoding means connected to said microcontrol store means and responsive to selected bits of said currently accessed micro-instruction for providing microaddress selection control signals for use in determining the microaddress of the next successive micro-instructions to be executed;

a plurality of microaddress sources capable of supplying the microaddress of the next successive microinstruction, said microaddress sources including microprogram counter means for providing the microaddress of the next successive micro-instruction stored in said microcontrol store means and said macro-instruction decoding means for providing a starting microaddress; and microaddress selection logic responsive to at least said microaddress selection control signals for selecting the microaddress of the next micro-instruction to be executed from one of said plurality of microaddress sources independently from all the other said microaddress sources and for supplying said selected microaddress directly and immediately to said microcontrol store.

2. In a data processing system in accordance with claim 1 wherein said plurality of microaddress sources includes stack storage means for storing a plurality of microaddresses of micro-instructions stored in said microcontrol store means, said stored microaddresses being stored in a selected order and including a last stored microaddress, the last stored microaddress in said stack storage means being made available to said microaddress selecting means from said stack storage means.

3. In a data processing system in accordance with claim 2 wherein said data processing system includes sources external to said microsequencing means capable of supplying selected bits for use in forming microaddresses and further wherein said plurality of microaddress sources includes microaddress forming means responsive to selected micro-instruction bits derived from said currently accessed micro-instruction and to the selected external bits received from said sources external to said microsequencing means for selectively combining said micro-instruction bits and said external bits into a plurality of concatenated formats to provide a plurality of concatenated microaddresses; and means for selecting one of said plurality of concatenated microaddresses, said selected concatenated microaddress being made available to said microaddress selection logic.

4. In a data processing system in accordance with claim 1 wherein said micro-instruction decoding means is further responsive to other selected bits of said currently accessed micro-instruction for determining whether the selection of the microaddress of the next successive micro-instruction is dependent upon a specified condition or is independent of any conditions, said microaddress selection logic being responsive to such determination for supplying a microaddress in accordance therewith.

5. In a data processing system in accordance with claim 4, said system further including means for storing status information defining the current status of said data processing system;

means responsive to selected bits of said currently accessed micro-instruction for determining if the address of the next successive micro-instruction to be executed is to be dependent upon said status information;

further decoding means responsive to selected bits of said currently accessed micro-instruction and to selected portions of said status information for determining whether said micro-instruction is dependent on a condition and, if so, which condition it is dependent on, and for providing a condition output signal which signifies whether such condition is or is not present; and said microaddress selection logic being further responsive to said condition output signal for further controlling the selection of the microaddress of the next successive micro-instruction.

6. In a data processing system having a central processor, a memory means, an arithmetic logic unit having first and second inputs capable of performing arithmetic or logical operations upon data supplied at said first and second inputs to produce an output therefrom, said first and second inputs being selectively supplied to said arithmetic logic unit by multiplexer means, a register file comprising a plurality of registers capable of storing data and having said data written into and read out therefrom, a logical address bus for transferring logical addresses within said data processing system, a central processor data bus for transferring data within said data processing system, said central processor including timing means for providing a timing signal for controlling the operating time cycle of said data processing system, said central processor including timing means for providing means for providing a timing signal for controlling the operating time cycle of said data processing system, said central processor further including means for decoding macro-instructions to produce starting microaddresses of micro-instructions, a micro-sequencing means for providing one or more successive micro-instructions for use by said central processor, said micro-sequencing means comprising:

microcontrol store means for storing a plurality of micro-instructions;

a plurality of microaddress sources capable of supplying the microaddress of the next micro-instruction to be executed from one of said sources, said sources including microprogram counter means and said macroinstruction decoding means for providing starting microaddresses;

means for selecting a microaddress from said plurality of microaddress sources;

said microcontrol store means being responsive to a microaddress selected from one of said microaddress sources for providing a current micro-instruction having at least fourteen control fields stored at said selected microaddress of said microcontrol store means;

micro-instruction decoding means responsive to said accessed micro-instruction for decoding said at least fourteen control fields, said micro-instruction decoding means comprising:

next address decoding means responsive to a first control field of twenty bits for generating control signals for selecting the microaddress of the next successive micro-instruction;

means responsive to a second control field of four bits for generating control signals for providing output date from a selected register of said register file, which output data can be used as a first input to said arithmetic logic unit;

means responsive to a third control field of four bits for generating control signals for providing output data from a selected register of said register file, which output data can be used as a second input to said arithmetic logic unit;

means responsive to a fourth control field of four bits for generating control signals for controlling the supply of data from a source other than said register file during a first selected portion of said operating time cycle, which data can be used to supply an input to said arithmetic logic unit;

means responsive to a fifth control field of two bits for generating control signals for controlling the supplying of data from a source other than said register file during a second selected portion of said operating time cycle, which data can be used to supply a selected input to said arithmetic logic unit;

means responsive to a sixth control field of four bits for generating control signals for controlling the shifting of selected data being operated upon by said arithmetic logic unit;

means responsive to a seventh control field of three bits for generating control signals for controlling the operation of said multiplexer means to select the data to be supplied to the inputs of said arithmetic logic unit;

means responsive to an eighth control field of three bits for generating control signals for controlling the logical and arithmetic operations of said arithmetic logic unit;

means responsive to a ninth control field of three bits for generating control signals for controlling the destination of the output from said arithmetic logic unit;

means responsive to a tenth control field of a single bit for generating control signals for controlling the type of carry operation to be used by said arithmetic logic unit;

means responsive to an eleventh control field of two bits for generating control signals for controlling the source of data to be placed on said logical address bus;

means responsive to a twelfth control field of five bits for generating control signals for controlling the source of data to be placed on said central processor data bus;

means responsive to a thirteenth control field of three bits for generating signals for controlling the reading and writing operations of said memory means; and means responsive to a fourteenth control field of two bits for generating control signals for controlling the completion of an operation with respect to said memory means.

7. In a data processing system in accordance with claim 6, which system further includes a plurality of scratch pad registers and an address translation means for converting logical addresses to physical addresses, said microcontrol store means providing a micro-instruction having at least two further control fields and said micro-instruction decoding means further including:

means responsive to a fifteenth control field of ten bits for generating a control signal for controlling arithmetic floating point and fixed point computations by said arithmetic logic unit, for controlling operations with respect to said scratch pad registers and with registers of said register file, and for controlling operations of said address translation means; and means responsive to a sixteenth control field of four bits for defining the functionality of said fourth control field, said seventh control field, said eighth control field, said nineth control field, said tenth control field, and said fifteenth control field.

8. In a data processing system in accordance with claims 6 or 7, said microcontrol store means providing a micro-instruction having at least one other field of one bit and said micro-instruction decoding means further including:

means responsive to said one other control field for detecting the odd or even parity of the micro-instruction word.

9. In a data processing system in accordance with claim 8 wherein said microcontrol store providing a micro-instruction having at least five additional bits which are reserved for use in providing one or more additional control fields.

10. In a data processing system in accordance with claim 9 wherein said microcontrol store means provides a micro-instruction word having a format of 80 bits, bits 0-19 defining said first control field, bits 20-23 defining said second control field, bits 24-27 defining said third control field, bits 28-31 defining said sixteenth control field, bits 32 and 33 defining said fourth control field, bits 34-37 defining said fifth control field, bits 38-41 defining said sixth control field, bits 42-45 defining said seventh control field, bits 46-48 defining said eighth control field, bits 49-51 defining said ninth control field, bit 52 defining said tenth control field, bits 53-62 defining said fifteenth control field, bits 63 and 64 defining said eleventh control field, bits 65-69 defining said twelveth control field, bits 70-72 defining said thirteenth control field, bits 73 and 74 defining said fourteenth control field, bits 75-79 being reserved for said one or more additional control fields, and bit 80 defining said seventeenth control field.

* * * * *